United States Patent Office 3,380,964
Patented Apr. 30, 1968

3,380,964
RETICULATED POLYIMIDES AND METHOD OF PRODUCING SAME FROM N,N'-BIS-IMIDES
Friedrich Grundschober and Joerg Sambeth, Veyrier, Geneva, Switzerland, assignors to Rhodiaceto, Paris, France
No Drawing. Filed Nov. 15, 1965, Ser. No. 507,656
Claims priority, application Switzerland, Nov. 13, 1964, 14,838/64
15 Claims. (Cl. 260—47)

ABSTRACT OF THE DISCLOSURE

Reticulated polyimides consisting of repeating units of

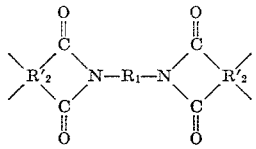

wherein $R_1$ is selected from the group consisting of an ethylene residue, an alkyl residue, an aryl residue, a cyclohexyl residue, at least two aryl residues or cyclohexyl residues, bonded to one another through at least one of the following radicals: —$CH_2$—, —$SO_2$— and —O— and wherein $R'_2$ is a radical of the structure:

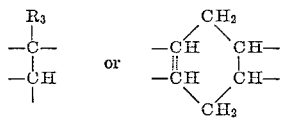

wherein $R_3$ is H or $CH_3$.

The polyimides are produced by heating, at a temperature ranging from 80° to 400° C. for the length of time necessary to obtain said polyimide, at least one N,N'-bis-imide of an unsaturated dicarboxylic acid having the general formula:

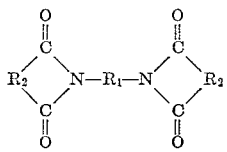

wherein $R_1$ is as defined above and $R_2$ is a radical of the structure:

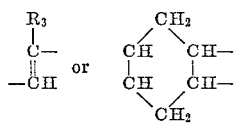

wherein $R_3$ is H or $CH_3$.

---

This invention relates to polyimides and to their production.

At present it is only known to produce linear polyimides, in particular from diamines and tetracarboxylic acid dianhydrides.

Although these polyimides have excellent thermal properties by virtue of their imidic structure, they suffer from a disadvantage which is inherent in their method of production, this disadvantage being that they cannot be produced in the form of bodies having a certain thickness. This is due to the fact that they are prepared in two stages, the first stage consisting in preparing a polyamide acid and the second consisting in forming an imide cycle by cyclization of this acid and in eliminating the water resulting therefrom. It is this elimination of water which prevents the production of polyimides in the form of shaped bodies. Since these linear polyimides are infusible and insoluble, it is also not possible to use them for the manufacture of molded objects.

According to the present invention there is provided a reticulated polyimide which consists of the following basic structural unit:

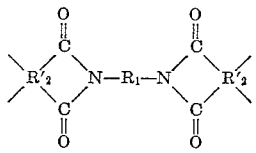

wherein $R_1$ is selected from the group consisting of an ethylene residue, an alkyl residue, an aryl residue, a cyclohexyl residue, at least two aryl residues or cyclohexyl residues, bonded to one another through at least one of the following radicals: —$CH_2$—, —$SO_2$— and —O— and wherein $R'_2$ is a radical of the structure:

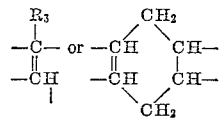

wherein $R_3$ is H or $CH_3$.

The invention also provides a method of producing a reticulated polyimide which comprises heating, at a temperature ranging from 80° to 400° C. for the length of time necessary to obtain said polyimide, at least one N,N'-bis-imide of an unsaturated dicarboxylic acid having the general formula:

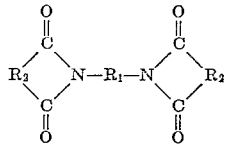

wherein $R_1$ is as defined above and $R_2$ is a radical of the structure:

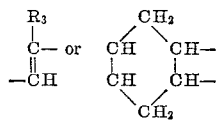

wherein $R_3$ is H or $CH_3$.

The method thus consists in polymerizing at least one N,N'-bis-imide of an unsaturated dicarboxylic acid. Polymerization is carried out by heating the bis-imide at a temperature ranging from 80° to 400° C. The best results were obtained at temperatures between 100° and 300° C. In some cases, it is preferable to effect polymerization in the presence of a catalyst capable of providing free radicals.

The polymerization reaction can take place in the absence or in the presence of an inert solvent. In the first case, the bis-imide or a mixture thereof with the catalyst is heated in a container at normal pressure for the length of time that is necessary to obtain a polyimide in the form of a solid body which is more or less homogeneous and which is infusible and insoluble. The bis-imide, or the mixture, can be heated in a mold at a pressure greater than normal, thus making it possible to obtain a polyimide in the form of an infusible and insoluble body having a highly homogeneous structure.

In the second case, bis-imide, or the mixture thereof with the catalyst, is dissolved in an inert solvent, whereupon the resulting solution is brought to the boiling point. The polyimide, which is obtained by precipitation, comes in the form of an infusible and insoluble powder. By way of solvent, use can be made, for example, of xylene, benzene, and triethylene glycol dimethyl ether.

As regards the choice of bis-imide, good results were obtained with bis-imides in which $R_2$ is a radical having the structures

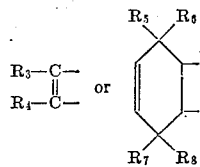

where $R_3$ is hydrogen or methyl and $R_4$ to $R_8$ are hydrogen.

Of these bis-imides, use will preferably be made of a maleic acid N,N'-bis-imide, such as, for example, N,N'-ethylene-bis-maleimide, N,N' - hexamethylene-bis-maleimide, N,N'-m-phenylene-bis-maleimide, N,N'-p-phenylene-bis-maleimide, N,N'-p,p'-diphenylmethane-bis-maleimide, N,N'-p,p'-diphenylether-bis-maleimide, N,N'-diphenylsulphone-bis-maleimide, N,N' - dicyclohexylmethane-bis-maleimide, N,N'-α,α'-p-dimethylene-cyclohexane-bis-maleimide, and N,N'-m-xylylene-bis-maleimide. Use can also be made of the corresponding N,N'-bis-imides of citraconic acid or of tetrahydrophthalic acid.

As regards the catalyst, there can be used a peroxide, such as, for example, dicumylperoxide and dibenzoylperoxide. Use can also be made of an azo derivative, such as, for example, azo-bis-isobutyronitrile. As for the quantity of catalyst to be used, it must be chosen so that the molar ratio between the bis-imide and the catalyst will lie between 1:0.001 and 1:0.05.

The method may for example be practised as follows:

Example 1

10 g. of N,N'-m-phenylene-bis-maleimide are heated for 30 minutes at a temperature of 210° C. The resultant product is a solid body which has a density of 1.42 and which is homogeneous, infusible and insoluble; it decomposes at about 460° C.

After ageing for 88 hours at 220° C., this product has the following properties:

| | At 22° C. | At 200° C. | At 250° C. |
|---|---|---|---|
| Dielectric constant (at 50 c./s.) | 5.1 | 5.2 | 5.7 |
| Tangent σ (at 50 c./s.) | 2·10⁻³ | 2·10⁻³ | 8.5·10⁻³ |
| Resistivity (ohms/cm.) | 1.15·10¹⁵ | | |

The Vicat test could not be carried out normally, i.e. to achieve a penetration of 1 mm. with a needle having a cross-section of 1 mm.$^2$ and subjected to a pressure of 5 kg./mm.$^2$, in view of the fact that there is no substantial softening before reaching the temperature of decomposition. The needle penetrates to an extent of 0.1 mm. at 375° C. and of 0.5 mm. at 400° C.

Example 2

20 g. of N,N'-p-phenylene-bis-maleimide are heated in a mold of a desired shape for 1 hour at a temperature of 340° C. and a pressure of 100 kg./cm.$^2$. The resultant product is a molded body which has a density of 1.45 and which is infusible and insoluble; it decomposes at about 470° C. The Vicat needle penetrates to an extent of 0.1 mm. at 350° C. and of 0.25 mm. at 400° C.

Example 3

10 g. N,N'-p-phenylene-bis-maleimide are dissolved in 100 cm.$^3$ of triethylene glycol dimethyl ether and this solution is heated for 1 hour at a temperature of 210° C. The resultant product, obtained by precipitation, is a white powder which is infusible and insoluble; it decomposes at about 470° C.

Example 4

10 g. of N,N'-ethylene-bis-maleimide are mixed with 0.2 g. of dicumylperoxide and the mixture is heated for 1 hour at a temperature of 180° C. The resultant product is a solid body which has a density of 1.3 and which is infusible and insoluble; it decomposes at about 460° C.

Example 5

10 g. of N,N'-hexamethylene-bis-maleimide are mixed with 0.02 g. of dicumylperoxide and the mixture is heated for some hours at a temperature of 150° C. The resultant product is a solid body which has a density of 1.34 and which is insoluble and infusible; it decomposes at about 380° C. The Vicat needle penetrates to an extent of 0.1 mm. at 350° C.

Example 6

The procedure is the same as in Example 4, using 10 g. of N,N'-diphenylsulphone-bis-maleimide. The product, which is solid, infusible and insoluble, decomposes at about 400° C.

Example 7

The procedure is the same as in Example 4, using 10 g. of N,N'-dicyclohexylmethane-bis-maleimide. The solid body, which is infusible and insoluble, decomposes at about 340° C.

Example 8

The procedure is the same as in Example 4, using 10 g. N,N'-p-α,α'-dimethylene-cyclohexane-bis-maleimide. The product, which is solid, infusible and insoluble, decomposes at about 460° C.

Example 9

The procedure is the same as in Example 4, using 10 g. of N,N'-m-xylylene-bis-maleimide. The product, which is solid, infusible and insoluble, decomposes at about 460° C.

Example 10

10 g. of N,N'-p-phenylene-bis-maleimide are mixed with 0.02 g. of dibenzoylperoxide and the mixture is heated in a mold of a desired shape for 1 hour at a temperature of 340° C. and a pressure of 100 kg./cm.$^2$. The resultant product is a molded body which is insoluble and infusible; it decomposes at about 470° C.

Example 11

10 g. of N,N'-phenylene-bis-maleimide together with 0.1 g. of azo-bis-isobutyronitrile are dissolved in 100 cm.$^3$ of xylene and the solution is heated for 3 hours at its boiling point. A precipitate is obtained in the form of a white powder which is insoluble and infusible. The product decomposes at about 470° C.

Example 12

10 g. of N,N'-p,p'-diphenylmethane-bis-maleimide are mixed with 0.1 g. of dicumylperoxide and the mixture is heated, in a mold, for two hours at a temperature of 160° C. and a pressure of 100 kg./cm.$^2$. The resultant product is a transparent body, which has a density of 1.30, which is insoluble and infusible and which decomposes at about 420° C. The Vicat needle penetrates to an extent of 0.1 mm. at 350° C. and of 0.5 mm. at 400° C.

Example 13

10 g. of N,N'-p,p'-diphenylether-bis-maleimide are heated to complete fusion, whereupon 6 g. of silicon oxide are added. After degassing, the mixture is poured into a mold of a desired shape and is heated for 3 days at 200° C.

A molded body is obtained which is infusible and insoluble and which decomposes at 470° C. and which has the following properties:

|  | At 22° C. | At 200° C. | At 250° C. |
|---|---|---|---|
| Dielectric constant (at 50 c./s.) | 5.4 | 5.5 | 5.8 |
| Tangent σ (at 50 c./s.) | 2·10⁻³ | 2·10⁻³ | 5·10⁻³ |
| Resistivity (ohms./cm.) | 8·10¹⁴ | | |

The Vicat needle penetrates to an extent of 0.1 mm. at 400° C.

Example 14

A mixture of 5 g. of N,N'-m-phenylene-bis-maleimide and 5 g. of N,N'-p,p'-dimethylether-bis-maleimide are heated at 190° C. until complete fusion has taken place, whereupon the mixture, after being degassed, is poured into a mold of a desired shape and heated for three days at 200° C.

A molded body is obtained which is infusible and insoluble and which decomposes at 470° C. The Vicat needle penetrates to an extent of 0.18 mm. at 350° C. and of 0.5 mm. at 400° C. The body has a resistivity of $0.85 \cdot 10^{14}$ ohms/cm.

The reticulated structure of the polyimides according to the invention was ascertained through infra-red spectrography by comparing the spectra of the monomer and the polymer obtained from said monomer.

Thus, the absorption bands existing in the spectrum of N,N'-p-phenylene-bis-maleimide at 3080 cm.⁻¹ (valency vibration of hydrogen in the —CH=CH— group), at 1575 cm.⁻¹ (valency vibration of the >C=C< group), at 865 cm.⁻¹ and at 685 cm.⁻¹, respectively, no longer appear in the spectrum of the polymer. However, the absoption bands that characterize the imide groups (at 1710 cm.⁻¹ and a shoulder at 1765 cm.⁻¹) are identical in the spectra of the monomer and of the polymer. It can therefore be deduced that polymerization takes place through an opening of the double carbon-carbon bonds and that the imide cycles remain intact.

The same results were obtained by comparing the infrared spectra of other monomers, in particular of N,N'-m-phenylene-bis-maleimide (Example 1) and of N,N'-p,p'-diphenylether-bis-maleimide (Example 13) (such spectra being, except in one instance, identical to that of N,N'-p-phenylene-bis-maleimide), with the spectra of the corresponding polymers.

As will be observed from the examples given above, these new polyimides are insoluble and infusible products having excellent thermal stability. They can be produced in the form of molded bodies having good mechanical resistance. They also have good dielectric properties, even at high temperature, thus making them highly suitable materials for electrical insulations.

What is claimed is:
1. A reticulated polyimide which consists of the following structural unit:

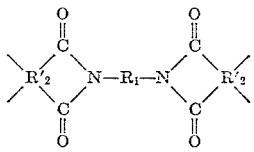

wherein R₁ is selected from the group consisting of an ethylene residue, an aryl residue, a cyclohexyl residue, at least two aryl residues bonded to one another through at least one of the following radicals: —CH₂—, —SO₂—, and —O—, or at least two cyclohexyl residues bonded to one another through a —CH₂— radical, and wherein R'₂ is a radical of the structure:

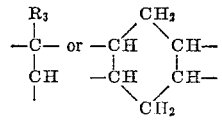

wherein R₃ is H or CH₃.

2. A reticulated polyimide according to claim 1, which is a polymer of a maleic acid N,N'-bis-imide.
3. A reticulated polyimide according to claim 2, wherein the maleic acid N,N'-bis-imide is selected from the group consisting of N,N'-ethylene-bis-maleimide, N,N'-hexamethylene-bis-maleimide, N,N'-m-phenylene-bis-maleimide, N,N'-p-phenylene-bis-maleimide, N,N'-p,p'-diphenylmethane-bis-maleimide, N,N'-p,p'-diphenylether-bis-maleimide, N,N'-diphenylsulphone-bis-maleimide, N,N'-dicyclohexylmethane-bis-maleimide, N,N'-α,α'-p-dimethylene-cyclohexane-bis-maleimide, and N,N'-m-xylylene-bis-maleimide.
4. A reticulated polyimide according to claim 1, which is a polymer of N,N'-m-phenylene-bis-maleimide and N,N'-p,p'-diphenylether-bis-maleimide.
5. A method of producing a reticulated polyimide, which comprises heating at a temperature ranging from 80° C. to 400° C. for the length of time necessary to obtain said polymer, at least one N,N-bis-imide of an unsaturated dicarboxylic acid having the general formula:

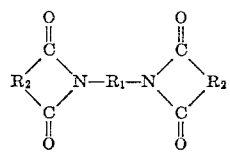

wherein R₁ is selected from the group consisting of an ethylene residue, an alkyl residue, an aryl residue, a cyclohexyl residue, at least two aryl residues bonded to one another through at least one of the following radicals: —CH₂—, —SO₂—, and —O—, or at least two cyclohexyl residues bonded to one another through a —CH₂— radical, and wherein R₂ is a radical of the structure

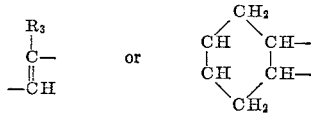

wherein R₃ is H or CH₃.

6. A method according to claim 5, wherein the N,N'-bis-imide is heated in the presence of a catalyst capable of providing free radicals.
7. A method according to claim 5, wherein the N,N'-bis-imide is heated in the presence of an inert solvent.
8. A method according to claim 5, wherein the N,N'-bis-imide is heated in a mold at a pressure greater than normal.
9. A method according to claim 5, wherein the N,N'-bis-imide is heated at a temperature ranging from 100° to 300° C.
10. A method according to claim 6, wherein the molar ratio between said N,N'-bis-imide and the catalyst is 1:0.001–0.05.
11. A method according to claim 5, wherein the N,N'-bis-imide is selected from the group comprising N,N'-ethylene-bis-maleimide, N,N'-hexamethylene-bis-maleimide, N,N'-m-xylylene-bis-maleimide, N,N'-p,p'-diphenylmethane-bis-maleimide, N,N'-p,p'-diphenylether-bis-maleimide, N,N'-diphenylsulphone-bis-maleimide, N,N'-dicyclohexylmethane-bis-maleide, N,N'-p-α,α'-dimethylene-cyclohexane-bis-maleimide, N,N'-p-phenylene-bis-maleimide, N,N'-m-phenylene-bis-maleimide and N,N'-bis-imides of citraconic and tetrahydrophthalic acids.

12. A method according to claim 6, wherein the catalyst is a peroxide or an azo derivative.

13. A method according to claim 12, wherein the peroxide is dicumylperoxide or dibenzoylperoxide.

14. A method according to claim 12, wherein the azo derivative is azo-bis-isobutyronitrile.

15. A method according to claim 7, wherein the solvent is benzene, xylene or triethylene glycol dimethyl ether.

References Cited

UNITED STATES PATENTS 3,137,678   6/1964   Jousset _____ 260—78

WILLIAM H. SHORT, *Primary Examiner.*

L. L. LEE, *Assistant Examiner.*

UNITED STATES PATENT OFFICE
CERTIFICATE OF CORRECTION

Patent No. 3,380,964                              April 30, 1968

Friedrich Grundschober et al.

It is certified that error appears in the above identified patent and that said Letters Patent are hereby corrected as shown below:

In the heading to the printed specification, line 5, "Rhodiaceto" should read -- Rhodiaceta --. Column 1, lines 28 to 32, the right-hand formula should appear as shown below:

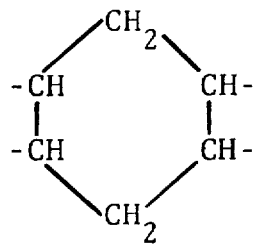

same column 1, lines 48 to 54, column 2, lines 43 to 48, and column 6, lines 45 to 50, the right-hand formulas, each occurrence, should appear as shown below:

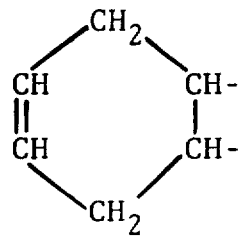

Column 2, lines 21 to 25, the formulas should appear as shown below:

(2)

 are 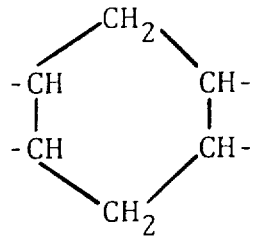

Column 6, lines 3 to 8, the left-hand formula should appear as shown below:

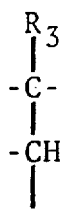

Signed and sealed this 10th day of March 1970.

(SEAL)
Attest:

EDWARD M. FLETCHER, JR.
Attesting Officer

WILLIAM E. SCHUYLER, JR.
Commissioner of Patents

UNITED STATES PATENT OFFICE
CERTIFICATE OF CORRECTION

Patent No. 3,380,964   Dated April 30, 1968

Inventor(s) Friedrich Grundschober and Joerg Sambeth

It is certified that error appears in the above-identified patent and that said Letters Patent are hereby corrected as shown below:

Column 5, line 72: Between the words "ethylene residue" and "an aryl residue" insert --an alkyl residue--

Signed and sealed this 18th day of December 1973.

(SEAL)
Attest:

EDWARD M. FLETCHER, JR.         RENE D. TEGTMEYER
Attesting Officer               Acting Commissioner of Patents